United States Patent [19]

Hernandez

[11] Patent Number: 4,696,430

[45] Date of Patent: Sep. 29, 1987

[54] METHOD AND APPARATUS FOR APPLYING POWDERED SUBSTANCES ON FARM FIELDS, FORESTS AND SWAMP AREAS

[76] Inventor: Genaro C. Hernandez, Paseo de las Fuentes, 4412 Fracc, Villa de las Fuentes, Monterrey, Nuevo Leon, Mexico

[21] Appl. No.: 861,717

[22] Filed: May 12, 1986

Related U.S. Application Data

[62] Division of Ser. No. 757,938, Jul. 23, 1985, Pat. No. 4,609,152.

[51] Int. Cl.$^4$ .......................... A62C 1/12; B05B 17/00
[52] U.S. Cl. ............................................ 239/8; 239/1
[58] Field of Search ................ 239/1, 8, 77, 144, 200, 239/280, 659, 660; 222/199, 231, 209, 235; 416/51, 146 R, 197 A

[56] References Cited

U.S. PATENT DOCUMENTS

| | | | |
|---|---|---|---|
| 1,058,464 | 4/1913 | Pritchard | 239/200 |
| 2,750,708 | 6/1956 | Handfield | 239/77 X |
| 3,944,139 | 3/1976 | Butler | 239/77 |

FOREIGN PATENT DOCUMENTS 14309  9/1923  Australia ............................ 239/200

*Primary Examiner*—Andres Kashnikow
*Assistant Examiner*—Patrick N. Burkhart
*Attorney, Agent, or Firm*—Roylance, Abrams, Berdo & Goodman

[57] ABSTRACT

A method of applying a powdered substance over a given area. The method includes the steps of providing a plurality of wind-powered devices which slowly dispense the powdered substance. Each of the devices includes a container for holding a quantity of the powdered substance. In addition, each of the devices includes a mechanism directly powered by the wind for dispensing the powdered substance from the containers. A plurality of the devices are spaced apart in a grid above the area to be treated by the powdered substance. A quantity of the powdered substance is placed in the containers of each of the devices. The wind will then power the dispensing mechanism of each container such that the powdered substance is dispensed from the container and distributed over the given area by the wind.

1 Claim, 8 Drawing Figures

METHOD AND APPARATUS FOR APPLYING POWDERED SUBSTANCES ON FARM FIELDS, FORRESTS AND SWAMP AREAS

This is a division of application Ser. No. 757,938, filed July 23, 1985, now U.S. Pat. No. 4,609,152.

FIELD OF THE INVENTION

This invention is related to a method and apparatus activated by the wind for applying powdered substances on farm fields, forests and swamp areas.

SUMMARY OF THE INVENTION

The apparatus according to this invention is employed by placing it above an open area, for example on crop lands. The force of the wind activates the apparatus, and the apparatus releases the powdered substance, for example powdered insecticide, which is then deposited on the crop plants by the wind. In some embodiments, the apparatus is designed to release insecticide at wind speeds of 1 Km/hour to 20 Km/hour. In these embodiments, when the wind speed is above 20 Km/hour, a mechanism activates to stop the release of the insecticide, to thus prevent the insecticide from being carried beyond the crop or place of desired application.

The advantages of the apparatus and method according to this invention include reducing the need for aerial applications of insecticides; providing a constant toxic environment for the crop; killing insects before they deposit eggs; reducing the insect population daily and reducing the cost of energy required to apply insecticide to an area since the apparatus is run by wind power.

BRIEF DESCRIPTION OF THE DRAWINGS

The apparatus of the present invention is illustrated in the accompanying drawings, wherein.

DETAILED DESCRIPTION OF THE DRAWINGS

Referring to the Figures, the illustrated apparatus according to this invention includes tower M comprised of housing assembly L mounted on a pole J. Pole J has its lower end embedded in the soil for support. Any other known methods of supporting pole J can be employed.

Housing assembly L includes housing F that is filled with a powdered substance such as powdered insecticide. The insecticide is poured into housing F through an opening (located at the top of housing F) closed by cap assembly K. Housing F is attached to pole J by band fasteners D and is cylindrically shaped.

Figure 1:
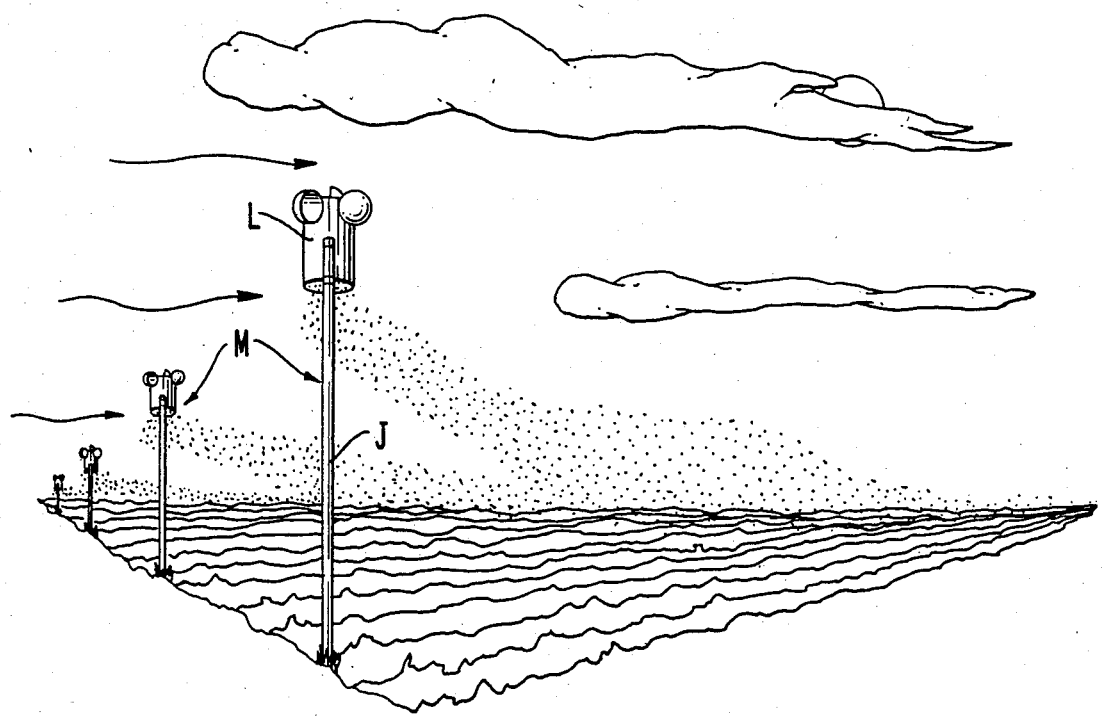
FIG. 1 is a perspective view of four of the towers of the present invention, illustrating the towers functioning on crop land.
Figure 3:
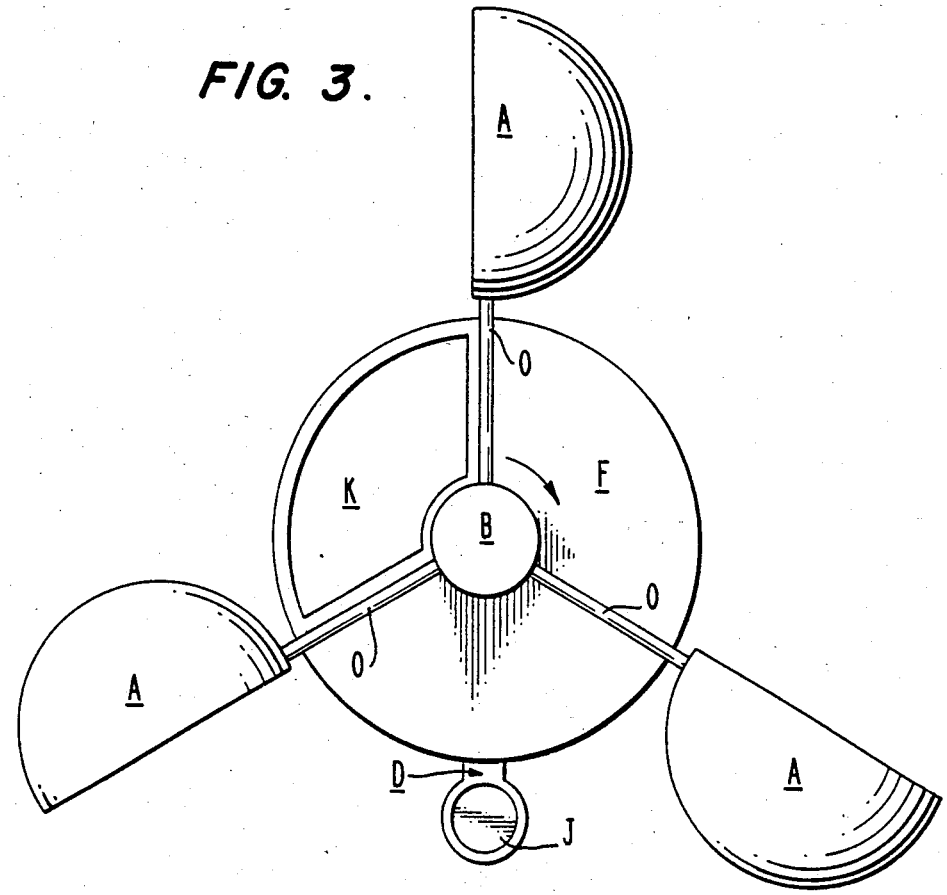
FIG. 3 is a top view of the apparatus illustrated in FIG. 2.
Figure 2:
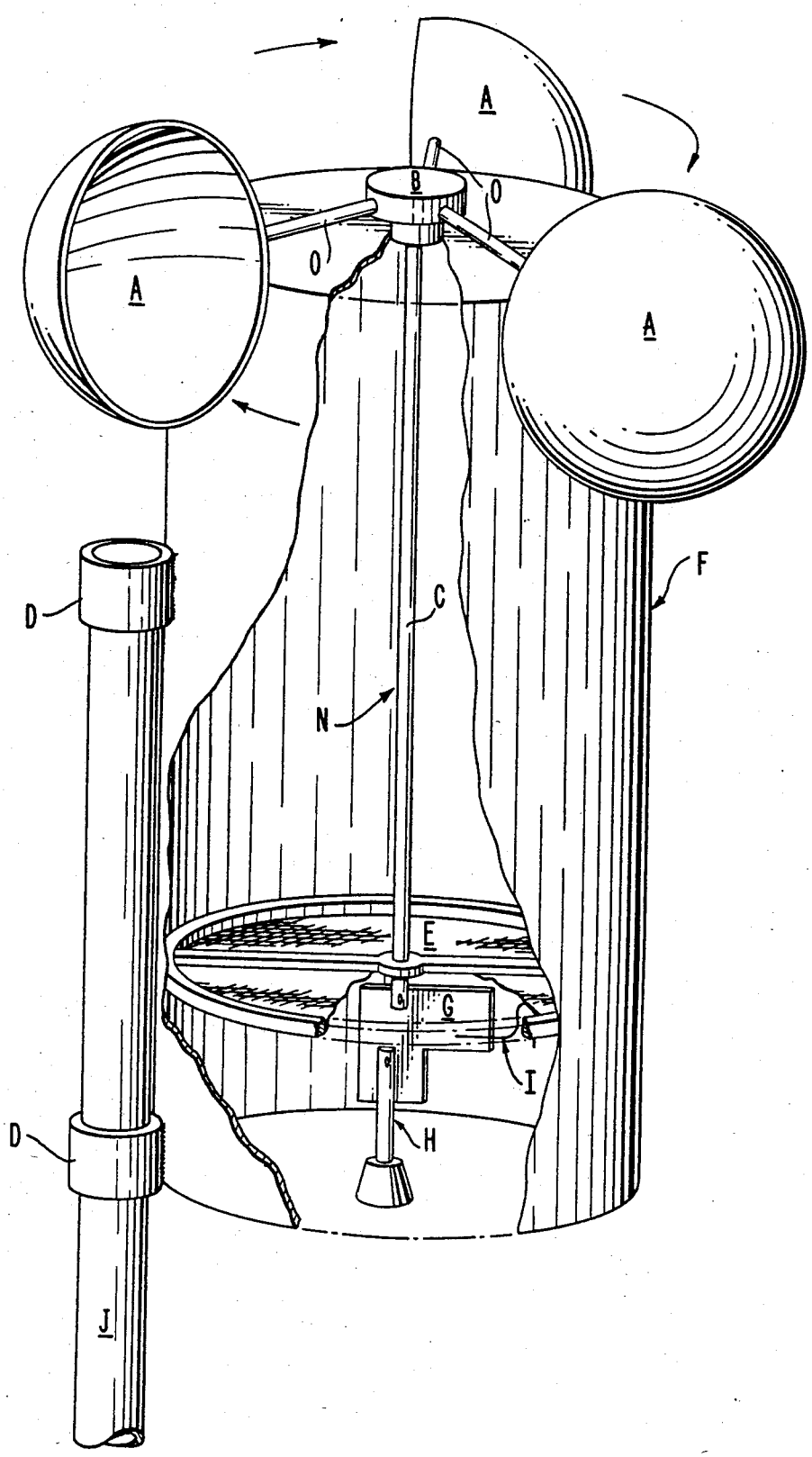
FIG. 2 is a side view, partially cut-away for clarity, of the top portion of a tower according to this invention.
Figure 4:
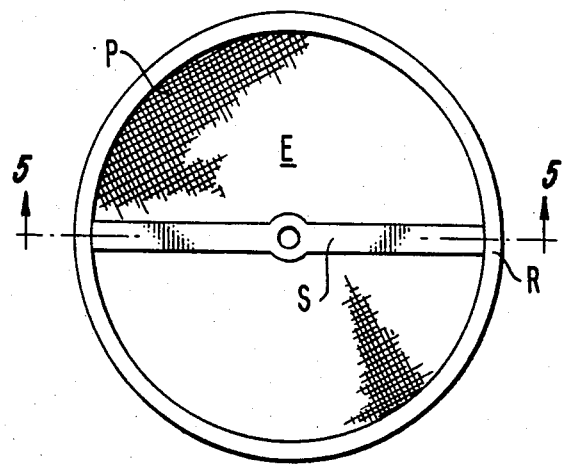
FIG. 4 is a top view of a sieve that may be included in the apparatus illustrated in FIGS. 1-3.
Figure 5:
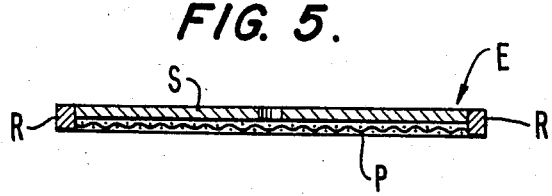
FIG. 5 is a side cross-sectional view of the sieve illustrated in FIG. 4.

Housing assembly L also includes sieve E and wind motor assembly N, which is in turn comprised of center pole C, hub B, blades A, spokes O, plate G, counterweight assembly H and scraper I. Sieve E is comprised of metal or cloth mesh P stretched onto ring band R. Sieve E may also include a cross support, such as cross support S, illustrated in FIG. 4. In some embodiments, mesh P can be directly attached to housing F, eliminating the need for ring band R and possibly cross support S.

Sieve E is fixedly attached within housing F near the lower portion thereof. Center pole C is rotatably received through the center of the top plate of housing F and sieve E. Housing F is open-ended at the bottom end.

Plate G is attached to the lower end of center pole C, below sieve E, and is in the shape of an inverted L. Scraper I is attached to the horizontal leg of the "L" and counterweight assembly H is attached to the vertical leg of the "L". Scraper I, which is a bent rod in the embodiments illustrated in the Figures, is designed to scrape the bottom of sieve E when plate G is vertically oriented. When the motor assembly N is at rest, plate G and scraper I lie in parallel vertical planes. Counterweight assembly H is rotatably attached to plate G, offset from the connection of plate G to center pole C. Plate G and counterweight assembly H act to stop the release of the powdered substance if the wind speed is too high, as discussed below.

Wind blades A are cup-shaped to receive the force of the wind. Spokes O connect blades A to hub B. Hub B is in turn fixedly attached to the top of center pole C.

The apparatus of the present invention is employed by the following method. One or more towers M are installed in a field or other area. Insecticide, or another substance in powder form, is poured into each housing F through its top opening. Sieve E has a small enough mesh size that the insecticide is retained above sieve E. The wind then acts on blades A, rotating center pole C, and thus plate G, counterweight assembly H and scraper I. As scraper I rotates, it rubs the bottom of sieve E, thus vibrating sieve E. The vibration of sieve E causes the insecticide powder to pass through sieve E and exit out the open lower end of housing F. The wind then spreads this insecticide over the desired area.

Figure 6:
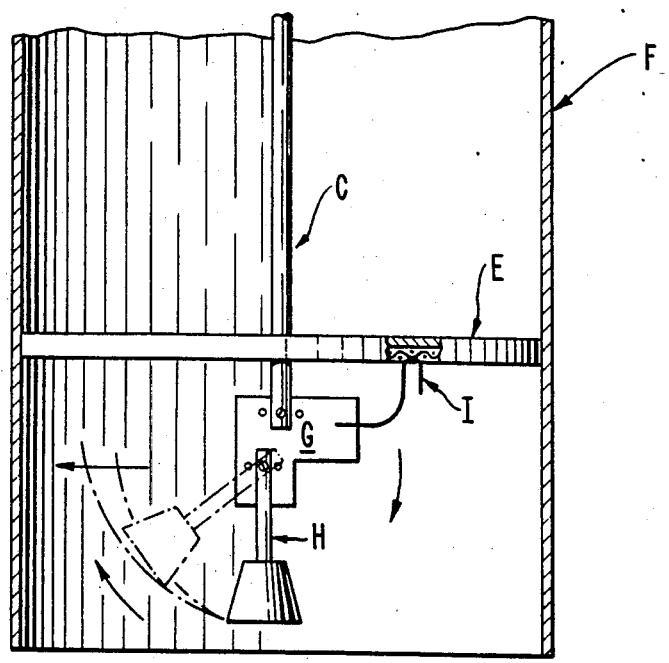
FIG. 6 is a partial cross sectional view of the lower operating parts of the apparatus illustrated in FIGS. 2 and 3.
Figure 7:
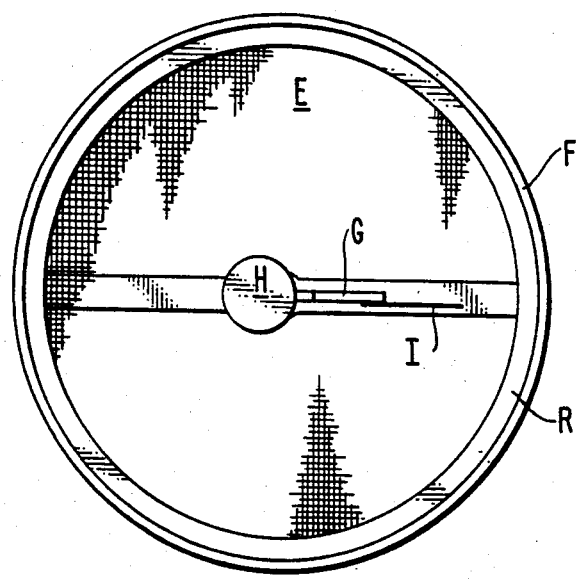
FIG. 7 is a bottom view of the housing assembly of the apparatus illustrated in FIGS. 2, 3, and 6.

However, if the wind speed is too high such that the insecticide is being carried onto areas beyond the desired application areas, then plate G and counterweight assembly H act to stop the release of insecticide. Once the wind speed is above a predetermined speed, counterweight assembly H will become vertically displaced as shown by the dotted lines in FIG. 6. This displacement of counterweight assembly H in turn flexes or twists plate G such that scraper I is brought out of contact with sieve E, thus stopping the release of insecticide.

The attachment points of plate G to center pole C and counterweight assembly H to plate G can be varied to adjust the wind speed at which plate G and counterweight H will stop the release of insecticide.

Figure 8:
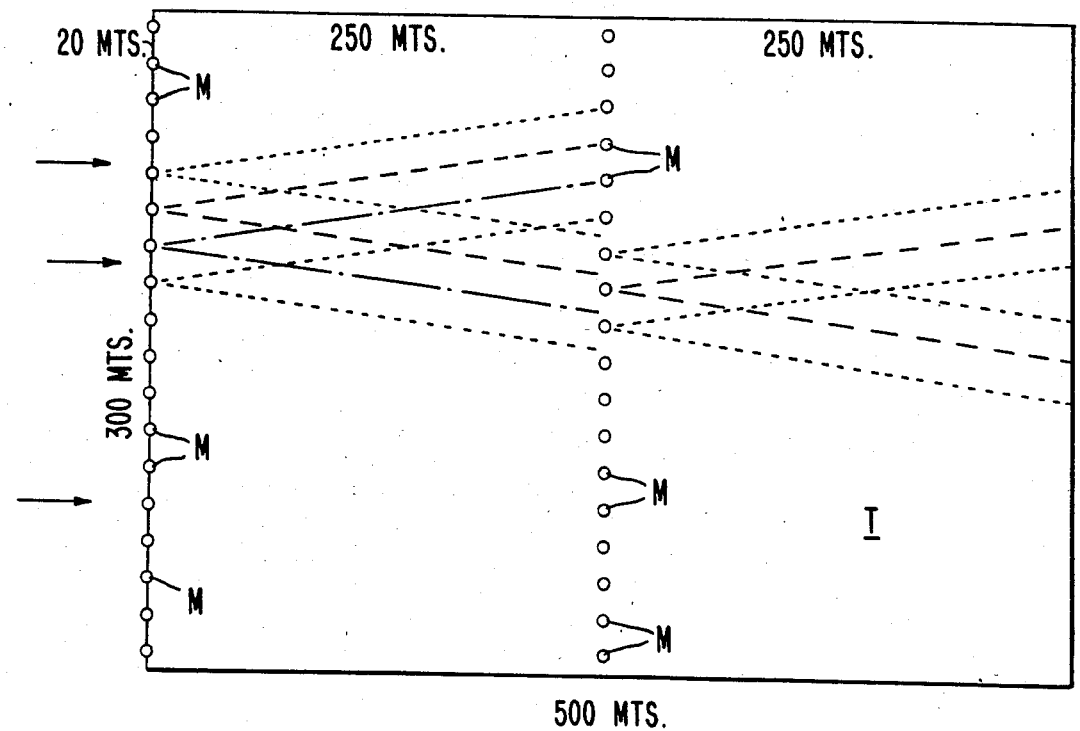
FIG. 8 is a schematic representation of a typical placement of the towers illustrated in FIGS. 2, 3, 6 and 7 in a field and of the the trajectories that the insecticide dispensed from the towers would follow over the crop land under certain wind conditions.

FIG. 8 illustrates one possible placement of towers M in a field T. Towers M are arranged in two rows spaced approximately 250 meters apart. The towers M of each row are spaced apart approximately 20 meters apart. Towers M are of a height such that housings F are positioned approximately 50 to 100 cms above the foilage or ground coverage.

Each tower M supplies a small cloud of insecticide powder such as pyrethroids and carbamates of low toxicity; this cloud increases its powdering angle as it advances in distance, until the individual clouds join and cross each other, as shown in FIG. 8.

The toxic clouds that are formed over the crop each time the wind blows exterminates the parent insects, not allowing them to deposit eggs, due to the constant toxic environment over the crops.

Other embodiments, modifications and improvements will become apparent to those skilled in the art once given this disclosure. Such other embodiments, modifications and improvements are considered to be within the scope of this invention as defined by the following claims:

What is claimed is:

1. A method of applying a powdered substance over a given area, comprising the steps of:
   providing a plurality of wind-powered devices for slowly dispersing said powdered substance, each of said devices including a container for holding a quantity of said powdered substance and means directly powered by the wind for dispensing said powdered substance from said container;
   positioning said plurality of devices spaced apart in a grid avove the given areas; and
   placing a quantity of the powdered substance in said containers of one or more of the devices.

* * * * *